United States Patent [19]

Holsztynski et al.

[11] 4,215,401

[45] Jul. 29, 1980

[54] CELLULAR DIGITAL ARRAY PROCESSOR

[75] Inventors: Wlodzimierz Holsztynski; Stephen S. Wilson, both of Ann Arbor, Mich.

[73] Assignee: Environmental Research Institute of Michigan, Ann Arbor, Mich.

[21] Appl. No.: 946,588

[22] Filed: Sep. 28, 1978

[51] Int. Cl.² .................................................. G06F 7/00
[52] U.S. Cl. .......................... 364/200; 340/146.3 MA; 364/515
[58] Field of Search ............. 340/146.3 H, 146.3 MA, 340/146.3 R; 364/200 MS File, 515, 900

[56] References Cited

U.S. PATENT DOCUMENTS

| | | | |
|---|---|---|---|
| 3,106,698 | 10/1963 | Unger | 364/200 |
| 3,753,238 | 8/1973 | Tutelman | 364/200 |
| 3,794,983 | 2/1974 | Sahin | 340/146.3 MA |
| 4,060,713 | 11/1977 | Golay | 340/146.3 MA |
| 4,065,808 | 12/1977 | Schomberg et al. | 364/200 |

OTHER PUBLICATIONS

Duff et al., "A Cellular Logic Array for Image Processing", *Pattern Recognition,* vol. 5, pp. 229-247, Sep. 1973.

*Primary Examiner*—Leo H. Boudreau
*Attorney, Agent, or Firm*—Krass & Young

[57] ABSTRACT

A rectangular digital logic array for performing transformations on data matrices for solving wave equations, image processing problems and the like, includes a plurality of identical cells each having a processing element which receives one of its inputs from a single bit accumulator and provides its output to a similar single bit accumulator. The input accumulators of each row in the array are formed by a single parallel input, parallel output shift register and the output accumulators of each column in the array are similarly formed by a parallel input, parallel output shift register. The shift registers operate to connect each cell except those at the edge of the array with two neighboring cells along one axis and two neighboring cells along the orthogonal axis. Four edge shift registers bordering the array allow data to be transferred into and out of the cells and a central processor connected to each of the cells controls the sequence of cell operations and the transfer of data between cells for all cells simultaneously. The simple cell and interconnection structure allows the economical formation of large arrays so that very high processing speeds may be achieved despite the multiple processing steps which each elemental cell must undergo in order to perform a complex computation.

20 Claims, 7 Drawing Figures

CELLULAR DIGITAL ARRAY PROCESSOR

BACKGROUND OF THE INVENTION

1. Field of the Invention

This invention relates to digital array processors of the type having a plurality of identical interconnected cells which perform sequential transformation operations on data matrices under the control of a central processor and more particularly to unique forms of cell construction and interconnection between the processing cells.

2. Prior Art

U.S. Pat. No. 3,106,698 to Unger discloses a parallel digital processor consisting of a rectangular array of identical processing elements each having storage and logic processing capability. Each cell in the array is interconnected with its eight neighboring cells through multiplexers or link circuits. Data may be introduced directly to the accumulator of each cell from the equivalent cell of an input array. The data is simultaneously processed in each of the cells under control of a programmable master control that determines the elemental process step to be performed simultaneously by all of the cells and the transfer of information between cells through the multiplexer links. Data in the form of a rectangular array of data signals may be introduced directly to the processing cells and then a series of transformations are performed on the input data to arrive at an output matrix.

The transformations performed by the Unger system and subsequent systems of this type were based upon the status of the interconnected neighboring cells and are thus often termed "neighborhood processors". See for example the description of the systems constructed by the Image Processing Group at the University College of London, England, described in the Proceedings of the Third International Conference on Pattern Recognition, I.E.E.E., pages 728–735 and U.S. Pat. No. 3,979,728.

As a result of the large number of neighborhood cells that influence each transformation, the processor elements of these systems are necessarily relatively complex as are the multiplexers. As a result, economic restraints severely limit the practical size of the arrays that may be formed. Despite efforts to simplify cell structure the largest practical proposal that we are aware of involves 128×128 array described in Lai-WoFunc, A High Speed Image Processing Computer Proceedings 17th Annual Technical Symposium National Bureau of Standards, 1978. While these processors have utility for use on certain problems expressed as relatively small matrices involving substantial arithmetic computations they have not proved economical for a wide variety of large matrix problems such as high resolution image processing and wave equations.

SUMMARY OF THE INVENTION

The present invention broadly constitutes a cellular array processor having a unique form of cell construction and a novel arrangement for interconnection of neighboring cells that greatly simplifies the array structure so that extremely large arrays may be economically constructed. These large arrays are capable of processing all of the elements of very large data matrices simultaneously and are thus well adapted to use in solution of a wide variety of problems which were heretofore uneconomical for use with array processors. For example, Vidicons and radar detectors may produce images having resolutions of 1000×1000 cells. Processors of the present invention may economically have a 1000×1000 array size or greater and accordingly may perform transformations on entire image matrices of this size simultaneously, greatly speeding the processing of such problems.

Like certain of the prior art systems the present invention employs a cell having a random access memory, a pair of accumulators and a processing element. The processing element has inputs from the random access memory and one of the accumulators and provides an output to second accumulator.

In the preferred embodiment of this invention, which will subsequently be disclosed in detail, the processing element consists of a NAND-gate. While more complex processing elements such as full adders may be employed with other embodiments of a single processor step, and thus increase processor speed, the simple NAND-gate structure permits the economic formation of large size processing arrays. Processing steps of any order of complexity may be achieved through an appropriate series of more elemental processing operations that can be implemented by NAND-gates.

Unlike prior art cellular array processors wherein interconnections between neighboring cells were achieved through multiplexers connected to a plurality of cells and controlled by the central processor to transfer information between the cells, the array of the present invention achieves interconnection between neighboring cells by means of direct connections between the input accumulators of neighboring cells along one linear axis and the output accumulators of neighboring cells along an orthogonal linear axis. An input accumulator may be connected to the input accumulators of the bordering cells in the North and South directions and an output accumulator may be connected to the output accumulators of bordering cells in the East and West directions. The connections between accumulators are serial so that all of the accumulators connected in one direction, i.e. those in each row of the array, form a serial chain while each line of connected accumulators in the other direction, each column, forms another serial chain. Through this simple interconnection grid, data may be transferred from any cell in the processor directly to four neighboring cells and indirectly to any other cell in the processor.

In the preferred embodiment of the invention the serial chains of accumulators are implemented as parallel input, parallel output shift registers. Each stage in the shift register acts as one accumulator for one of the processing cells of the array. The other accumulator of each cell is implemented by one stage of a second shift register extending in the orthogonal direction.

The processing array includes four bordering, parallel input, parallel output shift registers that "frame" the rectangular grid. Thus, all of the cells at each end of each of the "row" shift registers are connected to separate stages of edge shift registers that extend normally to the rows and the ends of the column shift registers are similarly terminated by two orthogonally extending shift registers. The four edge shift registers are interconnected to one another through a data bus and data may be inputted and outputted from the array through these edge shift registers further simplifying the structural arrangement of the array relative to the utilization of direct data connections into and out of each cell that characterized the prior art.

A simple set of microinstructions control the logical operations performed by the cells and the transfer of data within the cells, between the cells, and into and out of and between the shift registers. Operations which may have been performed by systems of the prior art in a single processing step may require a series of processing steps for the simplified cells of the present invention. For example, all of the prior art parallel array neighborhood processors of which we are aware have the capability of generating a simple function dependent upon the status of all of the neighboring cells in a single operation. By contrast, the system of the present invention generates a simple logical function of the status of a plurality of neighboring cells as a series of elemental functions each dependent upon the status of a single neighboring cell. For a wide class of problems the large increase in array size made possible by the unique structure of the present invention more than compensates for the increase in processing steps required to execute complex operations, and thus results in a reduction in processing time relative to the prior art systems.

Other objectives, advantages and applications of the present invention will be made apparent by the following detailed description of two preferred embodiments of the invention. The description makes reference to the accompanying drawings in which:

Figure 1:
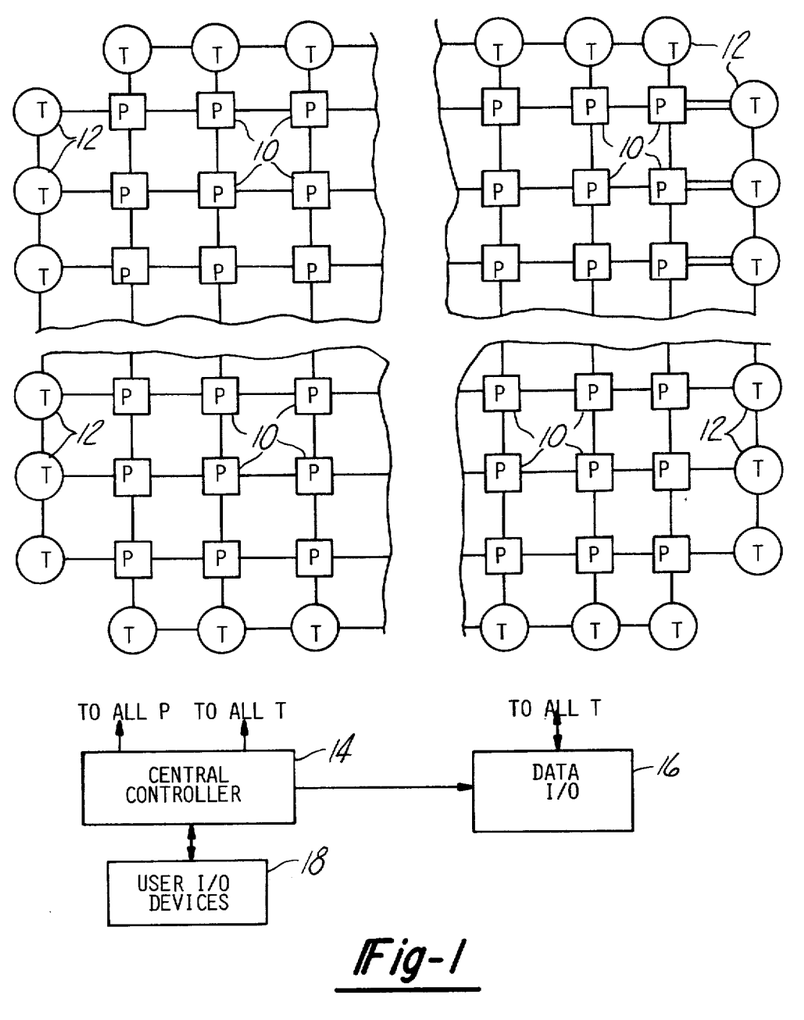
FIG. 1 is a conceptual block diagram of a computer formed in accordance with a preferred embodiment of the invention.

The preferred embodiment of the invention takes the form of a two dimensional array of processing cells 10, each denoted in FIG. 1 by the letter P. Each cell has interconnections with its immediate neighbors in the North, South, East and West directions. Thus, each cell 10 except those at the edges of the array has interconnections with four of its neighboring cells. The array of processing cells 10 is preferably very large and only the groups of cells in the four corners of the array are illustrated in FIG. 1.

The edges of the array are bounded by serial chains of data transfer cells 12 denoted by the letter T. These cells do not have a processing function but only operate to transfer data into and out of their connected processing cells 10. One transfer cell 12 is interconnected to each boundary cell of the array except those at the four corners of the array, which are interconnected to two of the transfer cells 12. All of the transfer cells bordering an edge of the array are interconnected to one another in a serial chain to allow data transfer between these cells.

A central controller 14 has interconnection to all of the processing cells 10 and all of the data transfer cells 12. Through its interconnection to the processing cells 10 the central controller determines the transfer of data within a cell and between interconnecting cells. Through its connection to the transfer cells 12 the central controller 14 determines the transfer of data between transfer cells and their interconnected processing cells and between the transfer cells themselves. The central controller also exercises control over a data input/output unit 60 which has data connections to all of the data transfer cells 12. This channel allows the transfer of data into and out of the processing array. Original data to be processed by the system is derived from user input/output devices 18 which are connected to the central controller and through the controller to the data input/output unit 16. The user devices may comprise keyboards, display devices and data sources and sinks including random access memories and bulk memories such as magnetic tape and the like.

Broadly, data to be processed is provided to the central controller 14 from appropriate I/O devices 18. The central controller 14 provides data in appropriate form to the input/output 16 and controls its provision to suitable data transfer cells 12. These transfer cells are then controlled by the controller 14 to transfer the data into their interconnected processing cells 10. Successive data transfers into the edge transfer cells and from the edge transfer cells to their neighboring processing cells are used to introduce an entire data matrix into the processor. The central controller 14 thus causes all of the processing cells 10 to simultaneously perform operations on the data under control of a program stored in the controller. A sequence of operations, including transfers between neighboring cells so that the cells may perform operations which are functions of the status of their neighbors, is controlled by central controller. Following the completion of a series of processing operations the resulting data matrix may be extracted from the processing array through the edge transfer cells 12 and the I/O port 16 and provided as output to an appropriate user device 18.

Figure 2:
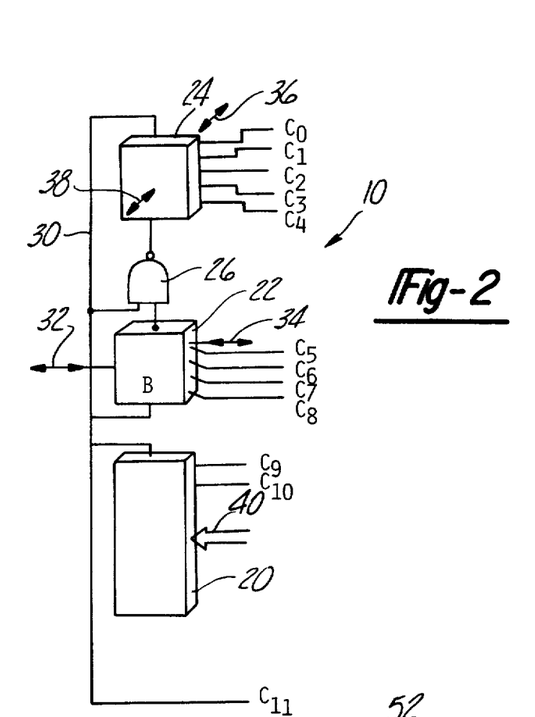
FIG. 2 is a schematic-block diagram of a typical processing cell used in the array processor of the preferred embodiment.

The processing cells 10 are all identical and a typical processing cell employed in a preferred embodiment of the invention is illustrated in FIG. 2. The cell, generally indicated at 10, includes a random access memory 20; a single bit input accumulator 22; a single bit output accumulator 24; and a NAND processing gate 26. A data transfer bus 30 connects to the RAM 20 and the two accumulators 22 and 24 as well as to one input of the NAND gate 26. The second input of the NAND gate 26 is provided by the input accumulator 22. The output of the NAND gate is provided to the output accumulator 24.

The input accumulator 22 has connections along lines 32 and 34 to a pair of neighboring cells in opposite directions. For purposes of reference the line 32 will be referred to as the interconnection with the West neighboring cell and the line 34 will be referred to as the interconnection with the East neighboring cells. The connection is a serial one and is bi-directional. The control of the accumulator 22 may be transferred to either the East or West neighboring cells and information from the East or West neighboring cells may be transferred to the input accumulator 22. To transfer data from the West cell to the East cell, or visa versa, the data must first be transferred to input accumulator 22.

Similarly, the output accumulator 24 is connected to two opposed neighboring processor cells 10 in a direction orthogonal to interconnections 32 and 34. For purposes of reference the output accumulator 24 will be termed as interconnected to the neighboring North cell via interconnection line 36 and to the neighboring South cell by interconnection line 38. In the case of boundary cells of the array, the interconnections may be to a data transfer cell 12 rather than to processor cells 10, but the interconnections are identical.

Each processor cell 10 interconnects with the central controller via 12 control lines designated $C_0$-$C_{11}$, as well as through a set of address lines 40 which control the address within the RAM access memory 20 that is connected to the bus 30. Control lines $C_0$-$C_4$ are connected to the output accumulator 24 and lines $C_5$-$C_8$ are connected to the input accumulator 22. Data transfer into and out of the accumulators 22 and 24 is conditioned by the status of lines $C_0$ through $C_8$. Control lines $C_9$ and $C_{10}$ provided to the RAM 20 determine whether data is read into or read out of the memory location addressed by the address lines 40. Control line $C_{11}$ determines whether the bus level is high or low.

The various possible operations of the processor cell 10 are determined by the specific conditions of the 12 command lines $C_0$-$C_{11}$. The action commanded by a high signal on a particular control line is as follows:

$C_0$: Accumulator 24 receives contents of accumulator 24 of South Processor cell via line 38 while simultaneously transmitting contents to North unit cell via line 36.

$C_1$: Accumulator 24 receives contents of accumulator 20 of North processor cell via line 36 while simultaneously transmitting contents to South unit cell via line 38.

$C_2$: Store BUS 30 into accumulator 24.

$C_3$: Store NAND 26 output into accumulator 24.

$C_4$: Transfer contents of accumulator 24 to BUS 30.

$C_5$: Accumulator 22 receives contents of accumulator 22 of West processor cell via line 32 while simultaneously transmitting contents to East unit cell via line 34.

$C_6$: Accumulator 22 receives contents of accumulator 22 of East processor cell via line 34 while simultaneously transmitting contents to West unit cell via line 32.

$C_7$: Store BUS 30 into accumulator 22.

$C_8$: Transfer contents of accumulator 22 to BUS 30.

$C_9$: Transfer contents of RAM 20 designated by address lines 40 to BUS 30.

$C_{10}$: Store contents of BUS 30 into RAM 20 at the location designated by address lines 40.

$C_{11}$: Set BUS 30 to logical 1 otherwise leave BUS 30 at logical 0. Any command which transfers data to BUS 30 will override this command.

The operations of the processing cells 10 are sufficiently general so that with this simple command set and proper programming it will duplicate the action of any processor having a similar memory size no matter how complex a processing element is used in that comparative processor.

Figure 3:
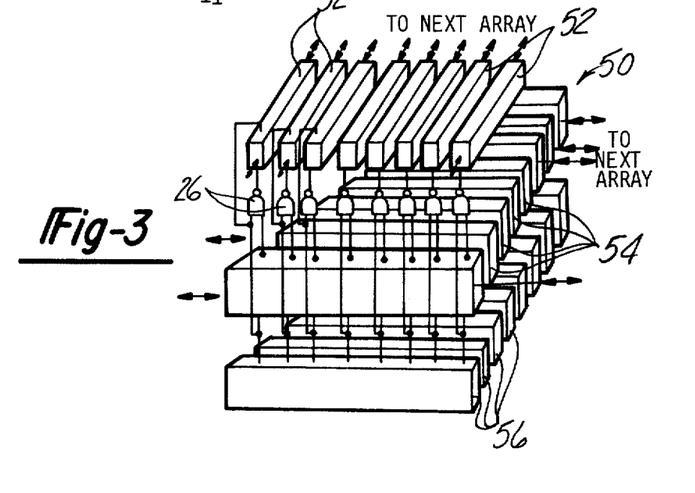
FIG. 3 is a schematic block diagram of a sub-array of processing cells which form a part of the array of the present invention.

The arrangement of the processor cell 10 allows the formation of a subarray or even a full array of cells to be implemented using one set of parallel input, parallel output shift registers to function as the input accumulators for all of the cells, a second set of another similar shift register as the output accumulators for all the cells and an array of random access memories. Since the central controller 14 sends identical commands to all of the processor cells 10 simultaneously the appropriate command signals sent to one of the shift registers will suffice for the control of all the processor cells sharing that element. FIG. 3 illustrates a subarray of processor cells formed in accordance with this arrangement. The subarray, generally indicated at 50, constitutes an 8×8 array of processor cells with each cell containing 128 bits of random access memory. The output accumulators for all of the processor cells in the array are formed by eight, eight bit serial-parallel, bi-directional shift registers 52. For example, these registers may be part number CD 4034A manufactured by RCA Corporation. Each element of each shift register has lateral connections to the output of a NAND gate 26 and a bus 30 and thus acts as the output accumulator for that processor cell. The longitudinal connections with the two neighboring elements from the North and South cell interconnections.

The input accumulators 22 for all of the processing cells in the subarray are similarly formed by eight, eight bit serial-parallel bi-directional shift registers 54 oriented to transfer data in direction orthogonal to the orientation of the shift registers 52. The lateral connections of each shift register element are to a NAND gate input and to a bus 30 and the longitudinal interconnections form the East and West processor cell interconnections.

The NAND gates 26 of each processing cell are preferably implemented with RCA Part No. CD 4011 which contains four gates in an integrated circuit package. The RAM function of all the processor cells of the subarray is implemented with eight integrated circuit memories 56 each consisting of 1024 bits arranged in a 128×8 bit array with eight I/O lines. These memory sections may preferably be Motorola Corporation MCM6810 integrated circuits.

It should be noted that the subarray 50 can be formed of commercially available parts employing only 40 integrated circuits to provide an array of 64 parallel processing elements. Present integrated circuit technology would allow the formation of the entire subarray as a single integrated circuit so as to allow the economic formation of a 1024×1024 parallel processor array using a number of subarrays. Continued improvements in the integrated circuit art should allow the construction of larger arrays on a single integrated circuit in the future.

Figure 4:
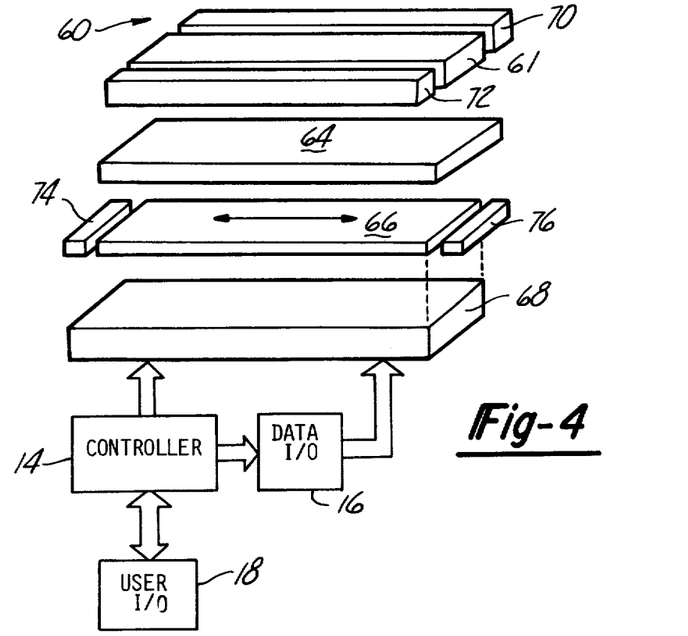
FIG. 4 is an exploded block diagram of the major components of the preferred embodiment of our invention.

An exploded view of a complete processor system formed in accordance with the present invention is illustrated in FIG. 4. The system may be implemented employing one or a plurality of interconnected subarrays 50 of FIG. 3. The system, generally indicated at 60, includes shift registers 61 forming the interconnected output accumulators; and NAND gates 64 for each processing element; interconnected input accumulator shift registers 66 directed orthogonally to the output accumulator shift register section 61; RAMS 68 having multiple I/O line connection; and the central controller 14 and its associated units 16 and 18.

The data transfer elements 12 in FIG. 1 along two axes of the array are formed by a pair of serial/parallel edge shift registers 70 and 72 which border and interconnect with two sides of the output accumulator array 61. Similarly, the data transfer elements 12 for the input accumulators 66 are formed by a pair of serial/parallel shift edge registers 74 and 76. For simplification of illustration the interconnections between the various operational boxes are not illustrated.

The edge shift registers 70, 72, 74 and 76 provide means for reading and writing data from the array via the edges and also permit a set of "global operations" which are subsequently defined.

Figure 5:
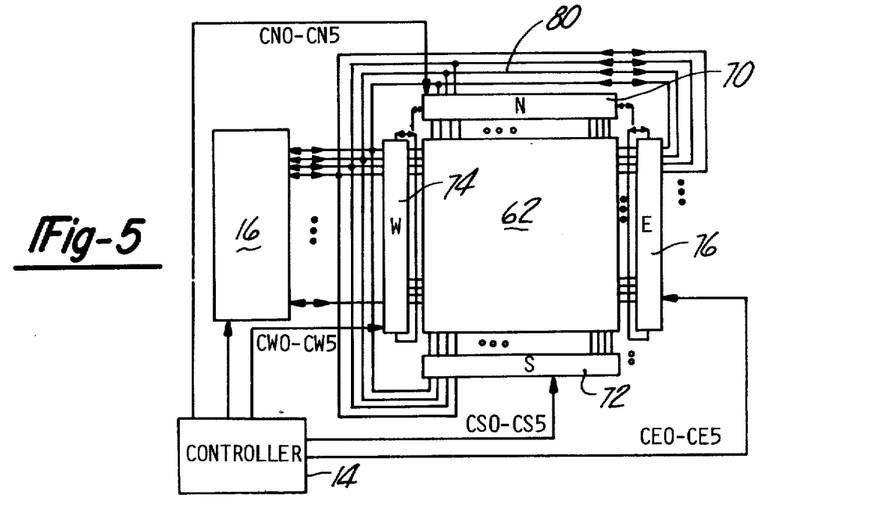
FIG. 5 is a block-schematic plan view of the arrangement of components that form the preferred embodiment of the invention.

The interconnections between the output accumulators and the edge shift register are illustrated in FIG. 5 which is the equivalent of the top view of the system of FIG. 4, but wherein array 62 represents the entire processor cell array.

The edge shift registers 70, 72, 74 and 76 are all interconnected by a parallel bus 80 which also makes parallel connections with the data I/O unit 16. The control processor 14 exercises control over the transfers between and via the edge shift registers through sets of command lines which interconnect the control processor with each of the shift registers. The six command lines denominated $CN_0$–$CN_5$ interconnect the processor 14 with the North edge shift register 70; lines $CS_0$–$CS_5$ control the South edge shift register 72; command lines $CW_0$–$CW_5$ control the West edge shift register 74; and command lines $CE_0$–$CE_5$ control the East edge shift register 76. The control functions exercised by these edge register command lines, when a particular command line contains an active signal, are as follows:

$CS_0$: Transfer contents of edge register 72 into processor cells adjacent to the South edge of array 62.

$CS_1$: Transfer contents of processor cells at the South edge of array 62 into register 72.

$CS_2$: Shift contents of register 72 East whereupon the content of the end bit on the East is "end around" transferred to the end bit on West end of register 72.

$CS_3$: Shift contents of register 72 West whereupon the content of the end bit on the West is end around transferred to the end bit on the East end of register 72.

$CS_4$: Transfer contents of register 72 to external lines 80.

$CS_5$: Transfer data on external lines 80 to register 72.

$CN_0$ through $CN_5$: These commands are respectively similar to commands $CS_0$ through $CS_5$ except that they involve shift register 70 and the processor cells at the North edge of array 62.

$CE_0$ through $CE_5$: These commands are similar to the above except that they involve shift register 76.

$CW_0$ through $CW_5$: These commands are similar to the above except that they involve shift register 74.

It is apparent that a wide variety of transfer operations can be performed using combinations of conditions of the command lines $C_0$–$C_{11}$, the address lines 40, and the edge register command lines $CS_0$–$CS_5$, etc. The following operations are typical.

1. Rotate North. In this operation the contents of the output accumulators 24 in array 62 are shifted North as per command $C_0$. It is desired to then transfer the contents of the accumulators 24 at the North edge of array 62 to the accumulators at the South edge of array 62. This operation is performed with the following sequence of commands.

a. Command $C_0$ simultaneously with command $CN_1$. Now North edge shift register 70 contains the contents of the accumulators at the North edge of array 62.

b. Command $CN_4$ simultaneously with command $CN_0$, also simultaneously with command $C_1$. Now the accumulator array 62 is restored to its original state while South edge shift register 72 now contains the contents of the accumulators at the North edge of array 62.

c. Command $C_0$ simultaneously with command $CS_0$. Now the array 62 is shifted North while the accumulators at the South edge of array 62 contain the data that had been at the North edge of array 62.

The command sequence required to implement the following three operations are similar to the command sequence for the rotate North operation.

2. Rotate South.
3. Rotate East.
4. Rotate West.

5. Spiral. This operation is similar to the rotate North operation with the exception that when the contents of the processor cells at the North edge are transferred to the South edge, they are displaced one step East before entering the South edge. This operation is performed with the same commands used in the Rotate North operation except that immediately following commands b set forth above, an extra command: $CS_2$ is used to displace the edge to the East by one step.

6. Data Input or Output. Data from an external source can be entered into array 62 by first transferring data to the external lines 80 from I/O unit 16 and then entering data into an edge shift register, e.g., 72 by activating command $CS_5$. Data can then be transferred to the array 62 by activating command $CS_0$.

7. Matrix Transposition. Referring to FIG. 4, a matrix transposition operation can be implemented with the following sequence of operations:

a. Rotate output accumulator array 61 one step North (according to the global operation 1 above).

The North shift register 70 now stores the contents that had been at the North edge of output accumulator array 61.

b. Transfer contents of the North shift register 70 into East shift register 76.

c. Shift input accumulator array 66 one step West while simultaneously transferring contents of East shift register 76 into the East edge of input accumulator array 66.

d. Repeat operations a, b and c until the contents of the entire output accumulator array 61 has been transferred into the input accumulator array 66. The output accumulator array 66 will now store the matrix transposition of the contents of the input accumulator array 61 which is now in its original state.

Rectangular arrays of any size smaller than the size of output accumulator array 61 can be transposed with fewer operations.

8. Double Width Arrays. It may be desirable to conceptually subdivide RAM memory 68 into four quadrants, such that as a whole it represents a 2-dimensional array of double width in both directions. Computations with such an array would utilize the edge shift registers 70, 72, 74 and 76 as temporary storage registers to join the boundaries of the various quandrants.

Figure 6:
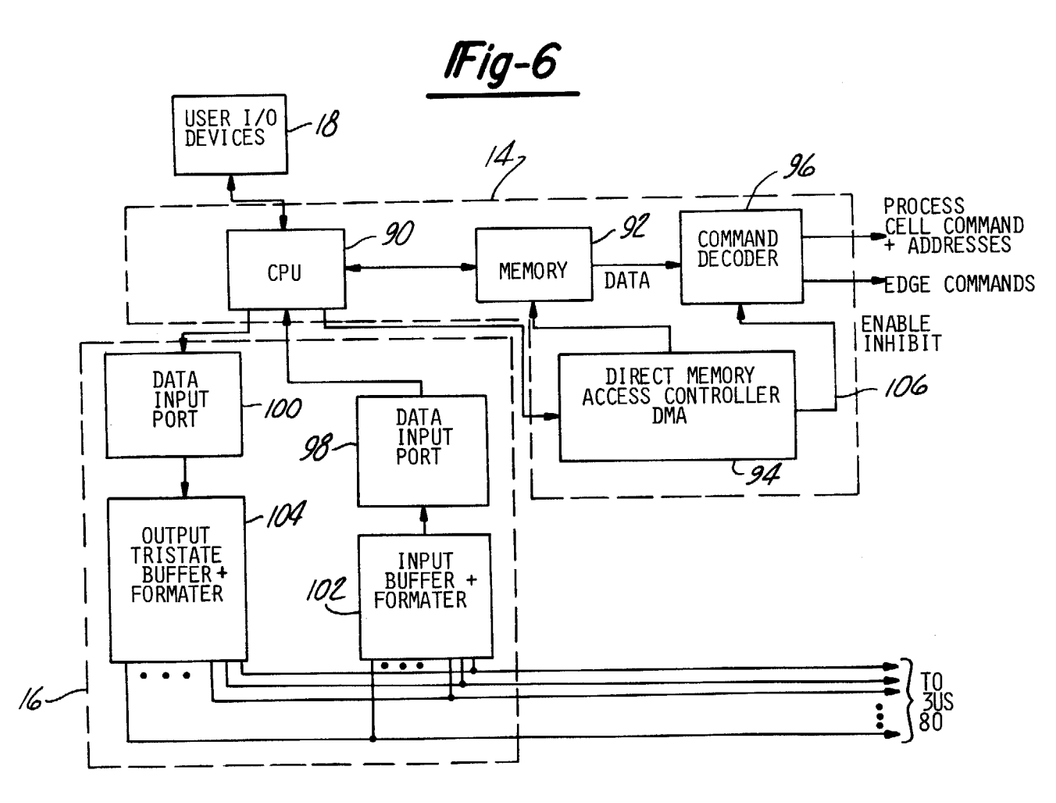
FIG. 6 is an expanded schematic diagram of the central controller and data input/output arrangement.

The central controller 14 and its associated devices are illustrated in greater detail in FIG. 6. The controller includes a central processor unit (CPU) 90; a memory section 92; a direct memory access controller (DMA) 94 and a command decoder 96. The data I/O unit 16 consists of data input ports 98, data output ports 100 and tri-state buffers and formaters 102 and 104 for the input port 98 and output port 100 respectively. This portion of the system could take the form of a commercially available general purpose computer system with appropriate programming.

The direct memory access controller 94 provides meams for generating a fast stream of commands directly from the controller to the command decoder 96 and avoids the slower alternative method of allowing the central processing unit 92 to read a command from memory and send it to the processing array through the output port 100.

The general operation of the system occurs in four steps:

1. LOAD

An area of the memory 92 is loaded with a series of commands to be performed by the system under control of the user I/O devices 18.

2. DATA INPUT (a) The command decoder is inhibited by means of an able/inhibit line 106 from the DMA 94.

(b) Data is sent from the CPU 90 to the output buffer and formater 104 through the data output port 100.

(c) The command decoder 96 is enabled and provided with a set of instructions through the direct memory access controller 94 which causes the processing array to read data through the bus 80 into one of the edge shift registers and finally into the processing cells 10.

Steps a, b and c are repeated until all data is loaded.

3. PROCESSING

The command decoder 96 is enabled and the DMA 94 causes a stream of commands to flow directly from the memory 92 to the processing array via the processor cell and edge commands and addresses 25.

4. DATA OUTPUT (a) A set of commands brings data to an edge shift register. This data is then latched into the input buffer and formater 102.

(b) The command decoder 96 is inhibited.

(c) The CPU 90 reads the data from the input buffer 102 through the input port 98.

(d) The data is printed or displayed through the I/O devices 18.

Figure 7:
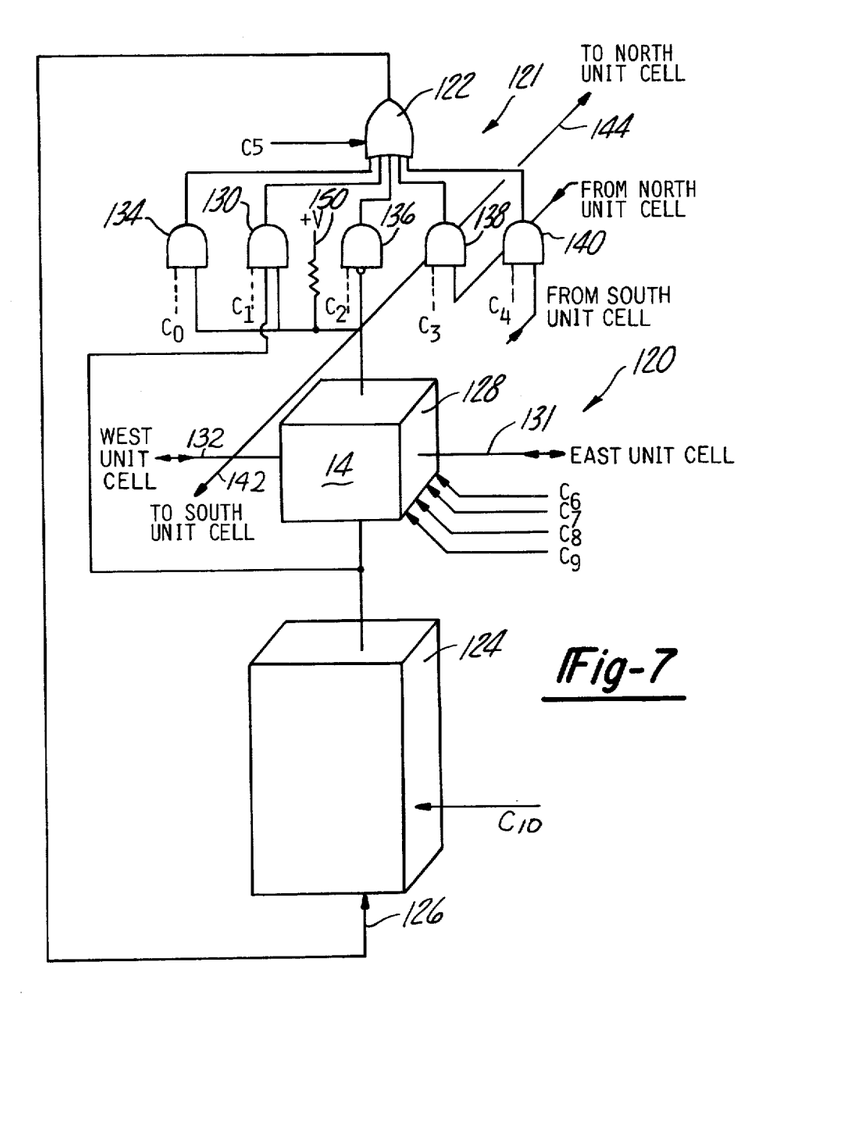
FIG. 7 is a schematic-block diagram of an alternative form of processor cell for use in connection with the present invention.

An alternarive form of processing cell 10, formed in accordance with the present invention, is illustrated in FIG. 7. The alternative processing cell, generally indicated at 120, employs a logical AND/OR array, generally indicated at 121. The RAM of the first embodiment is replaced by a lower cost shift register 124 that receives the output of the array 122 on its input line 126. The output of the shift register 124 is provided to a single bit, bi-directional, serial/parallel shift register 128 as well as to an input of an AND gate 130 forming part of the array 121. The gate 130 forms the sole arithmetic element of cell 120 and may be considered the equivalent of the cells processing element. The input accumulator 128 is connected to the neighboring processor cell on the East via line 131 and to the neighboring processor cell on the West via line 132.

The accumulator 128 output is provided to an AND gate 134 and its inverse is provided to an AND gate 136. An AND gate 138 has an input from the North neighboring processor cell and an AND gate 140 has an input from the South neighboring processor cell. Each of the gates 130, 134, 136, 138 and 140 have its output connected to an input of an OR gate 122 forming part of the processing array 121.

The processing array 121 controls the provision of data to the input of the shift register 124 as well as the transfer of the contents of the input accumulator 128 to the South neighboring processor cell via line 142 and to the North neighboring processing cell via line 144. This control is achieved as a function of the status of eleven command lines, $C_0$–$C_{10}$. Line $C_0$ is connected as a conditioning input to gate 134; line $C_1$ is connected as a conditioning input to gate 130; line $C_2$ is connected as a conditioning input to gate 136; line $C_3$ is connected as a conditioning input to gate 138; control line $C_4$ is connected as a conditioning input to gate 140; command line $C_5$ is connected directly to an input of OR gate 122; lines $C_6$–$C_9$ are connected to the accumulator 128 and line $C_{10}$ is connected to the shift input of the shift register 124. The commands and control actions which may be accomplished by an active condition of any of these lines is as follows:

$C_0$: Transfer contents of accumulator 128 to the shift register 124 input line 126.

$C_1$: Transfer output of AND gate 130 to shift register input line 126. The output of AND gate 130 is the logical AND of the contents of accumulator 128 with the output of shift register 124.

$C_2$: Transfer the logical complement of the contents of accumulator 128 to shift register input line 126.

$C_3$: Transfer contents of accumulator in North neighbor processing cell to shift register input line 126.

$C_4$: Transfer contents of accumulator in South neighbor processing cell to shift register input line 126.

$C_5$: Transfer logical one to shift register input line 126.

$C_6$: Accumulator 128 receives contents of West neighbor processing cell.

$C_7$: Accumulator 128 receives contents of East neighbor processing cell.

$C_8$: Disable accumulator output. The output will then be pulled to logic one by register 150.

$C_9$: Store output of memory element 124 into accumulator 128.

$C_{10}$: Shift the shift register 124.

Operations of the system employing cells 120 occur during a series of various simultaneous and sequential commands. Nine such operations are particularly important and are described as follows:

1. Rotate Up. Shift the contents of accumulator 128 into shift register 124, and the output of the shift register 124 into the accumulator 128. This operation is provided by first issuing command $C_0$ and then simultaneously issuing commands $C_9$ and $C_{10}$.

2. Interchange. This operation interchanges the order or two bits by shifting the output of shift register 124 into the input of shift register 124 leaving the contents of accumulator 128 intact. This operation is provided by first issuing simultaneously commands $C_1$ and $C_8$. Now the output of accumulator 128 will be logical one and the output of shift register 124 will be transferred to input line 126 by way of AND gate 130. Next command $C_{10}$ is issued.

3. Complement. This operation is similar to Operation 1 except that the logical complement of accumulator 128 is shifted into shift register 124. This operation is provided by first issuing command $C_2$ and then simultaneously issuing commands $C_9$ and $C_{10}$.

4. Zero. This operation shifts a logical zero into shift register 124 while the contents of accumulator 128 are lost. This operation is provided by first issuing $C_8$ simultaneously with command $C_2$. Now the output of accumulator 128 will be logical one and gate 136 will transmit logical one to line 126. Next commands $C_9$ and $C_{10}$ are simultaneously issued.

5. AND. This operation shifts the logical AND of the contents of accumulator 128 with the output of shift register 124. The commands are first $C_1$ and then simultaneously commands $C_9$ and $C_{10}$.

6. Shift North. This operation is similar to Operation 1, with the exception that the contents of the accumulator in the North processor cell is shifted in place of accumulator 128. The commands are first $C_3$ and then simultaneously $C_9$ and $C_{10}$.

7. Shift South. This operation is similar to Operation 6, except that the South processor is shifted by way of command $C_4$.

8. Shift East. In this operation the contents of accumulator 128 are transferred to the accumulator in the East processor cell through line 130 while simultaneously receiving data from the West processor cell through line 132. The command is $C_6$.

9. Shift West. This operation is similar to Operation 8, except that the direction of transfer is reversed. The command is $C_7$.

It will be appreciated by those skilled in the art that repeated application of the first two operations mentioned above (Rotate and Interchange) will generate all possible permutations of the string of bits in the shift register 124 and accumulator 130. Repeated applications of the next three operations (Complement, Zero, and AND) in conjunction with the first two operations which could be generated by any processor of comparable memory, will generate all mathematical transformation of the data in the processor cell. The last four shift operations 120 provide a means of communicating data between processor cells. Although this embodiment of the invention can accomplish the same function as the embodiment employing the processor cell of FIG. 2, a longer string of commands will generally be required to do so. The advantage of this embodiment is that the main memory element is a shift register rather than a random access memory and has a potential of being less costly.

The embodiments of the invention in which an exclusive property or privilege is claimed are defined as follows:

1. A rectangular digital processing array comprising: a plurality of processor cells each including a multi-bit memory having an input and an output, a first, input, single bit accumulator, a processing element having two inputs, one connected to receive the output of the multi-bit memory and the other connected to receive the output of the single bit accumulator; a second accumulator; first interconnections between the first accumulator of each cell and the first accumulators of two neighboring cells; second interconnections between the second accumulator of each cell and two neighboring cells which are different from the neighboring cells to which the first accumulator of each such cell is interconnected; and a controller connected to all of the cells in the array operative to control the transfer of data within each cell and through the interconnections between the cells.

2. The processing array of claim 1 wherein said second accumulator constitutes a single bit accumulator connected to the output of the processing element.

3. The rectangular digital processing array of claim 2 wherein said first interconnections between the input accumulators connect the cells into a plurality of columns and said second interconnections interconnect the cells into a plurality of rows, each cell of a row being a member of a different column.

4. The processing array of claim 1 wherein said first interconnections connect the cells into a plurality of columns and said second interconnections connect the cells into a plurality of rows, each cell of a row being a member of a different column.

5. The processing array of claim 1 wherein said processing element comprises an AND gate having a first input from the output from the first accumulator and a second input connected to said multi-bit memory.

6. The processing array of claim 5 wherein the second interconnections between cells are formed between the AND gates of the processing elements of interconnected cells.

7. The processing array of claim 1 wherein the multi-bit memory comprises a serial shift register.

8. The rectangular digital array processor of claim 1 including four transfer registers bounding the edges of the array;
a parallel bus interconnecting all of the elements of each of the transfer registers; and
means controlled by the controller for transferring information through the bus.

9. The rectangular digital processing array of claim 1 wherein the processor of each cell consists of a NAND-gate.

10. The rectangular digital processing array of claim 1 wherein the processor of each cell consists of a first AND-gate.

11. The rectangular digital processing array of claim 10 including an OR gate connected between said first AND gate and said multi-bit memory.

12. The rectangular digital processing array of claim 11 including a plurality of second AND gates having their outputs connected to the input of said OR gate, wherein said second interconnections between each cell and two neighboring cells constitute connections between the inputs of said AND gates of said cell and the outputs of the memories of adjacent cells.

13. The rectangular digital processing array of claim 12 including an inverting element connected to an input of at least one of said second AND gates so that the output of such AND gate is an inverse function of the condition of the input to the inverter.

14. A rectangular digital processing array comprising: a plurality of processor cells each including a multi-bit memory having an input and an output, a first, input accumulator having an input and an output, a second, output accumulator having an input and an output, and a processing element having two inputs, one connected to the output of the multi-bit memory and the other connected to the output of the input accumulator, and an interconnection between the output of the processing element and the input of the output accumulator; first interconnections between the input accumulator of each cell and the input accumulators of two neighboring cells; second interconnections between each cell and two neighboring cells which are different from the neighboring cells to which the input accumulator of each such cell is interconnected; and a controller connected to all of the cells operative to control the transfer of data from the memory to the processor of each cell and to control the transfer of data between the accumulators of interconnected cells.

15. The rectangular digital processing array of claim 14 including an edge transfer register having a number of interconnected storage elements equal in number to the rows in the array with each storage element being connected to a cell in the array, whereby data to be entered into the array may be transferring from the edge transfer register into array.

16. The rectangular digital processing array of claim 14 wherein the first accumulators of each of the cells in a row are formed by a single, serial-parallel shift register.

17. The rectangular digital processing array of claim 16 wherein the second accumulators of each cell in a column are formed by a single, serial-parallel shift register.

18. A rectangular digital array processor comprising: a plurality of cells each including a processing element having two inputs and an output, wherein the state of the output is an exclusive function of the states of the two inputs; a random access memory; circuitry connecting the output of the random access memory to a first input of the processor element; a first, input, single bit accumulator having its output connected to second input of the processor element; and a second, output, single bit accumulator having its input connected to the output of the processor element; first interconnections between the first accumulators of each cell in the array and the first accumulators of two neighboring cells in the array, said first interconnections being operative to interconnect the cells of the array into a series of linear rows; second interconnections between the output accumulators of each cell in the array and the output accumulators of two neighboring cells in the array which differ from the two cells in the array to which a given cell has the first interconnections, whereby said second interconnections connect the cells into a plurality of separate columns, said first and second interconnections being operative to allow transfer of data stored in an accumulator between interconnected accumulators; and a controller connected to each of the cells operative to control the transfer of data contained in the first or second accumulators of each cell to the first or second accumulators respectively of interconnected cells.

19. The rectangular digital array processor of claim 18 wherein the processing element comprises a NAND gate.

20. The rectangular digital array processor of claim 18 wherein the first accumulators of each of the cells in a row are formed by a single, serial-parallel shift register and the second accumulators of each cell in a column are formed by a single, serial-parallel shift register.

* * * * *